US010375203B2

(12) United States Patent
Ferris

(10) Patent No.: US 10,375,203 B2
(45) Date of Patent: Aug. 6, 2019

(54) GENERATING A SELECTION OF CLOUD DATA DISTRIBUTION SERVICE FROM ALTERNATIVE PROVIDERS FOR STAGING DATA TO HOST CLOUDS

(75) Inventor: James Michael Ferris, Cary, NC (US)

(73) Assignee: Red Hat, Inc., Raleigh, NC (US)

( * ) Notice: Subject to any disclaimer, the term of this patent is extended or adjusted under 35 U.S.C. 154(b) by 122 days.

(21) Appl. No.: 13/037,148

(22) Filed: Feb. 28, 2011

(65) Prior Publication Data

US 2012/0221696 A1 Aug. 30, 2012

(51) Int. Cl.
*G06F 15/173* (2006.01)
*H04L 29/08* (2006.01)
(Continued)

(52) U.S. Cl.
CPC ........ *H04L 67/327* (2013.01); *H04L 41/5096* (2013.01); *H04L 67/10* (2013.01); *H04L 12/145* (2013.01)

(58) Field of Classification Search
CPC ............. G06F 15/173; G06F 17/30156; G06F 17/30215; G06F 17/30221;
(Continued)

(56) References Cited

U.S. PATENT DOCUMENTS 6,072,787 A * 6/2000 Hamalainen et al. ........ 370/335
6,405,256 B1 * 6/2002 Lin ......................... H04L 29/06
709/201
(Continued)

OTHER PUBLICATIONS

Kumar et al. (A Roadmap for the Comparison of Identity Management Solutions Based on State-of-the-Art IdM Taxonomies, 2010, Springer-Verlag Berlin Heidelberg, CNSA 2010, CCIS 89, pp. 349-358).*

(Continued)

*Primary Examiner* — Vivek Srivastava
*Assistant Examiner* — Muhammad Raza
(74) *Attorney, Agent, or Firm* — Lowenstein Sandler LLP

(57) ABSTRACT

Embodiments relate to systems and methods for generating a selection of cloud data distribution service from alternative providers for staging data to host clouds. In aspects, a user can maintain a user premise network including servers, clients, local area networks, data stores, and/or other network assets. An administrator or other user of the premise network may wish to extract data from the premise network and transfer that data to host storage clouds to leverage cost, redundancy, consolidation, or other cloud advantages. A set of cloud data delivery (CDD) services can be established to stage the upload of the data payload to the set of destination host storage clouds. Uploads to the one or more intermediate CDD services can be made using a set of high-bandwidth managed or dedicated lines. The user can interrogate the set of alternative CDD services accessible to the premise network, and identify CDD services capable of staging the premise data to data stores in those intermediate services. Multiple CDDs can be rated and/or selected according to cost, schedule, capacity, and/or other transport parameters, and in cases the data payload can be divided for delivery over multiple CDD services.

19 Claims, 7 Drawing Sheets

(51) Int. Cl.
*H04L 12/24* (2006.01)
*H04L 12/14* (2006.01)

(58) Field of Classification Search
CPC ............. G06F 17/30289; G06F 17/302; G06F 17/30082; G06F 9/5044; G06F 11/3442; G06F 3/067; H04L 67/327; H04L 41/5096; H04L 67/10; H04L 12/00; H04L 67/1095; H04L 67/1097; H04L 67/06; H04L 67/32; H04L 69/329; H04L 69/14; H04L 67/28; H04L 67/2852; H04L 12/145; G06Q 10/06; G06Q 20/123; G06C 20/123
USPC .......................................... 709/224, 216, 223
See application file for complete search history.

(56) References Cited

U.S. PATENT DOCUMENTS

| | | | | |
|---|---|---|---|---|
| 7,117,294 | B1 * | 10/2006 | Mi | G06F 3/0605 711/101 |
| 2002/0042839 | A1 * | 4/2002 | Peiffer | H04L 29/06 709/238 |
| 2003/0033520 | A1 * | 2/2003 | Peiffer | H04L 29/06 713/153 |
| 2004/0093420 | A1 * | 5/2004 | Gamble | 709/231 |
| 2006/0047824 | A1 * | 3/2006 | Bowler | H04L 63/0236 709/229 |
| 2006/0101064 | A1 * | 5/2006 | Strong | G06F 17/30038 |
| 2006/0230078 | A1 * | 10/2006 | McConaughy | H04L 67/1095 |
| 2008/0320121 | A1 * | 12/2008 | Altaf et al. | 709/224 |
| 2009/0067331 | A1 * | 3/2009 | Watsen | H04L 45/00 370/235 |
| 2009/0125570 | A1 * | 5/2009 | Bailey | G06F 16/50 |
| 2010/0333116 | A1 * | 12/2010 | Prahlad et al. | 719/328 |
| 2011/0016214 | A1 * | 1/2011 | Jackson | 709/226 |
| 2012/0016721 | A1 * | 1/2012 | Weinman | 705/7.35 |
| 2012/0042162 | A1 * | 2/2012 | Anglin | G06F 21/57 713/165 |
| 2012/0047339 | A1 * | 2/2012 | Decasper | G06F 11/1076 711/162 |
| 2012/0124172 | A1 * | 5/2012 | Sparks | G06Q 20/123 709/219 |
| 2012/0158799 | A1 * | 6/2012 | Morsi | G06F 17/30289 707/812 |
| 2014/0258365 | A1 * | 9/2014 | L'Heureux | H04L 69/16 709/203 |

OTHER PUBLICATIONS

Jeffrey Darcy, "Systems and Methods for Cloud-Based Directory System Based on Hashed Values of Parent and Child Storage Locations," U.S. Appl. No. 12/893,612, filed Sep. 29, 2010.

Jeffrey Darcy, "Systems and Methods for Searching a Cloud-Based Distributed Storage Resources Using a Set of Expandable Probes", U.S. Appl. No. 12/893,737, filed Sep. 29, 2010.

Jeffrey Darcy, "Systems and Methods for Monitoring Files in Cloud-Based Networks", U.S. Appl. No. 12/893,388, filed Sep. 29, 2010.

Jeffrey Darcy, "Systems and Methods for Dynamically Replicating Data Objects Within a Storage Network", U.S. Appl. No. 12/872,022, filed Aug. 31, 2010.

James Michael Ferris, "Systems and Methods for Stage Data Migration Between Data Sources and Cloud-Based Storage Network", U.S. Appl. No. 13/037,183, filed Feb. 28, 2011.

James Michael Ferris, "Systems and Methods for De-Populating Cloud Data Storage", U.S. Appl. No. 13/036,977, filed Feb. 28, 2011.

James Michael Ferris, "Systems and Methods for Migrating Data Among Cloud-Based Storage Networks Via a Data Distribution Service", U.S. Appl. No. 13/037,215, filed Feb. 28, 2011.

James Michael Ferris, "Systems and Methods for Establishing Upload Channels to a Cloud Data Distribution Service", U.S. Appl. No. 13/037,230, filed Feb. 28, 2011.

James Michael Ferris, "Methods and Systems to Automatically Extract and Transport Data Associated with Workload Migrations to Cloud Networks", U.S. Appl. No. 13/116,599, filed May 26, 2011.

James Michael Ferris, "Systems and Methods for Cloud Data Deployment Based on Preferential and/or Existing Subscription Relationships", U.S. Appl. No. 13/117,331, filed May 27, 2011.

James Michael Ferris, "Methods and Systems for Data Compliance Management Associated with Cloud Migration Events", U.S. Appl. No. 13/118,123, filed May 27, 2011.

James Michael Ferris, "Systems and Methods for Determining Consistencies in Staged Replication Data to Improve Data Migration Efficiency in Cloud Based Networks", U.S. Appl. No. 13/117,235, filed May 27, 2011.

James Michael Ferris, "Systems and Methods for Generating Optimized Host Placement of Data Payload in Cloud-Based Storage Network", U.S. Appl. No. 13/118,075, filed May 27, 2011.

* cited by examiner

GENERATING A SELECTION OF CLOUD DATA DISTRIBUTION SERVICE FROM ALTERNATIVE PROVIDERS FOR STAGING DATA TO HOST CLOUDS

FIELD

The invention relates generally to systems and methods for generating a selection of a cloud data distribution service from alternative providers for staging data to host clouds, and more particularly, to platforms and techniques for identifying a set of multiple data distribution services that may be available to a premise network operator, permitting that operator to interrogate the various alternative data distribution services to determine those that satisfy the operator's data transport requirements, and initiating the transport of potentially large-scale data payloads to one or more selected distribution services.

BACKGROUND

The advent of cloud-based computing architectures has opened new possibilities for the rapid and scalable deployment of virtual Web stores, media outlets, social networking sites, and many other on-line sites or services. In general, a cloud-based architecture deploys a set of hosted resources such as processors, operating systems, software and other components that can be combined together to form virtual machines. A user or customer can request the instantiation of a virtual machine or set of machines from those resources from a central server or cloud management system to perform intended tasks, services, or applications. For example, a user may wish to set up and instantiate a virtual server from the cloud to create a storefront to market products or services on a temporary basis, for instance, to sell tickets to or merchandise for an upcoming sports or musical performance. The user can subscribe to the set of resources needed to build and run the set of instantiated virtual machines on a comparatively short-term basis, such as hours or days, for their intended application.

Typically, when a user utilizes a cloud, the user must track the software applications executed in the cloud and/or processes instantiated in the cloud. For example, the user must track the cloud processes to ensure that the correct cloud processes have been instantiated, that the cloud processes are functioning properly and/or efficiently, that the cloud is providing sufficient resources to the cloud processes, and so forth. Due in part to the user's requirements and overall usage of the cloud, the user may have many applications and/or processes instantiated in a cloud at any given instant, and the user's deployment of virtual machines, software, and other resources can change dynamically over time. In cases, the user may also utilize multiple independent clouds to support the user's cloud deployment. That user may further instantiate and use multiple applications or other software or services inside or across multiple of those cloud boundaries, and those resources may be used or consumed by multiple or differing end-user groups in those different cloud networks.

In terms of data deployment and migration to the cloud, in cases, an administrator or other user may wish to consider transporting a set of data from a premise-based network into cloud-hosted storage, for instance to leverage the cost, consolidation, management tools, and/or other features or advantages of the cloud. In an unmodified or unaided cloud storage platform, relatively large-scale storage resources may be available for users wishing to upload their data assets into the cloud, but without any special or enhanced set of connections into the host storage clouds. In the case of relatively large-scale premise data stores, such as those maintained, merely for instance, by hospitals, government agencies, financial institutions, or other entities, the amount of data that needs to be transported may be in the range of terabytes, petabytes, or more. In the case of those comparatively large-scale data installations, an attempt to migrate the data over public Internet connections, such as packet-switched TCP/IP (transfer control protocol/Internet protocol) or FTP (file transfer protocol) connections, the delivery of the data payload could require days or weeks of time.

For many organizations, that type of transfer delay may be impractical or impossible. In addition, the relatively narrow-bandwidth connections available over the public Internet may not be secure, and for sensitive data or applications, the use of such connections may also not be a valid or practical option. Moreover, narrow-bandwidth connections into a host storage cloud may not allow for data management services such as error correction, in-flight encryption, or other security or management options.

Moreover, in cases, the administrator, operator, and/or other user or users in a premise network may have no tool, interface, or engine to automatically locate and identify high-bandwidth channels or services available to them to buffer or stage potentially large-scale data payloads to data delivery services for temporary purposes, before transmitting the data to relatively long-term host storage clouds. This lack of selectability can be problematic in the case where a set of multiple and/or competitive data delivery services are located within geographic proximity, and/or are otherwise available, to the user's premise network. However, no tool or facility exists to give the user a view of those competitive services or to possibly query or evaluate them, for selection purposes. Nor do platforms exist which permit the user to specify a set of transport parameters to select data pathways, channels, costs, and/or other required resources from a set of intermediate data distribution services, of those could be located.

It may be desirable to provide systems and methods for generating a selection of cloud data distribution service from alternative providers for staging data to host clouds, in which a set of independent and/or intermediate data center facilities are installed, located, or identified between premise data sources and those distribution services as intermediate stages to one or more potential host storage clouds, and in which the premise administrator and/or other user can query or interrogate the set of alternative data distribution services available to them to determine or select one or more such service to carry out a data transport event to stage a data payload before delivery to the cloud, based on that user's specified data transport parameters.

DESCRIPTION

Figure 1:
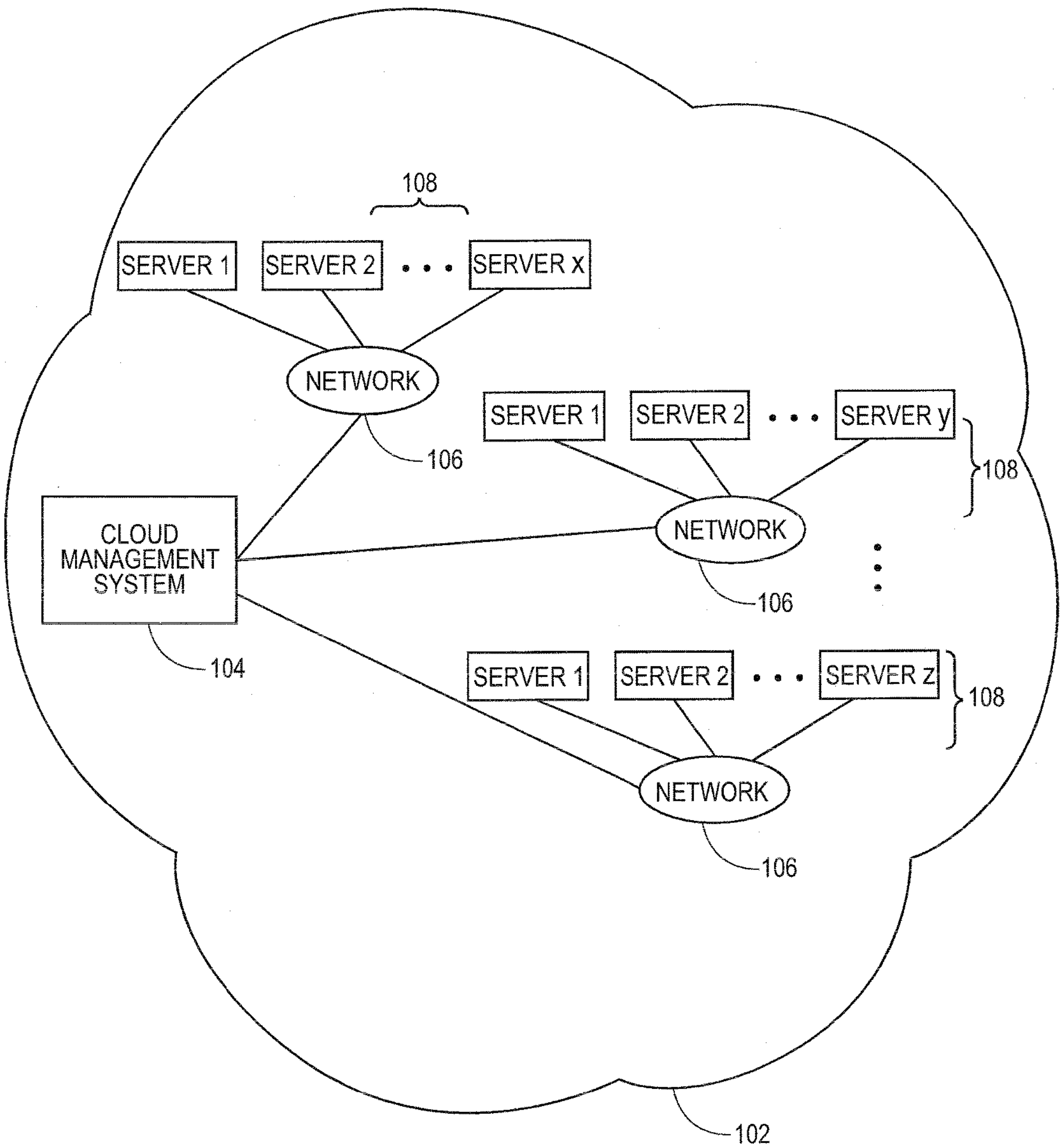
FIG. 1 illustrates an overall cloud system architecture in which various aspects of systems and methods for generating a selection of a cloud data distribution service from alternative providers for staging data to host clouds can be practiced, according to embodiments.

Embodiments described herein can be implemented in or supported by a cloud network architecture. As used herein, a "cloud" can comprise a collection of hardware, software, services, and/or resources that can be invoked to instantiate a virtual machine, process, or other resource for a limited or defined duration. As shown for example in FIG. 1, the collection of resources supporting a cloud 102 can at a hardware level comprise a set of resource servers 108 configured to deliver computing components needed to instantiate a virtual machine, process, service, or other resource. For example, one group of resource servers in set of resource servers 108 can host and serve an operating system, and/or components, utilities, or interfaces related to that operating system, to deliver to a virtual target, and instantiate that machine with an image of that operating system. Another group of servers in set of resource servers 108 can accept requests to host computing cycles or processor time, memory allocations, communications ports or links, and/or other resources to supply a defined level of processing power or throughput for a virtual machine. A further group of resource servers in set of resource servers 108 can host and serve applications or other software to load on an instantiation of a virtual machine, such as an email client, a browser application, a messaging application, or other applications, software, or services. Other types of resource servers can be used to support one or more clouds 102.

In embodiments, the entire set of resource servers 108 and/or other hardware or software resources used to support one or more clouds 102, along with the set of instantiated virtual machines, can be managed by a cloud management system 104. The cloud management system 104 can comprise a dedicated or centralized server and/or other software, hardware, services, and network tools that communicate via network 106, such as the Internet or other public or private network, with all servers in set of resource servers 108 to manage the cloud 102 and its operation. To instantiate a new or updated set of virtual machines, a user can transmit an instantiation request to the cloud management system 104 for the particular type of virtual machine they wish to invoke for their intended application. A user can for instance make a request to instantiate a set of virtual machines configured for email, messaging or other applications from the cloud 102. The virtual machines can be instantiated as virtual client machines, virtual appliance machines consisting of special-purpose or dedicated-task machines as understood in the art, and/or as other virtual machines or entities. The request to invoke and instantiate the desired complement of virtual machines can be received and processed by the cloud management system 104, which identifies the type of virtual machine, process, or other resource being requested in that platform's associated cloud. The cloud management system 104 can then identify the collection of hardware, software, service, and/or other resources necessary to instantiate that complement of virtual machines or other resources. In embodiments, the set of instantiated virtual machines or other resources can, for example, and as noted, comprise virtual transaction servers used to support Web storefronts, Web pages, and/or other transaction sites.

In embodiments, the user's instantiation request can specify a variety of parameters defining the operation of the set of virtual machines to be invoked. The instantiation request, for example, can specify a defined period of time for which the instantiated collection of machines, services, or processes is needed. The period of time can be, for example, an hour, a day, a month, or other interval of time. In embodiments, the user's instantiation request can specify the instantiation of a set of virtual machines or processes on a task basis, rather than for a predetermined amount or interval of time. For instance, a user could request a set of virtual provisioning servers and other resources until a target software update is completed on a population of corporate or other machines. The user's instantiation request can in further regards specify other parameters that define the configuration and operation of the set of virtual machines or other instantiated resources. For example, the request can specify a specific minimum or maximum amount of processing power or input/output (I/O) throughput that the user wishes to be available to each instance of the virtual machine or other resource. In embodiments, the requesting user can for instance specify a service level agreement (SLA) acceptable for their desired set of applications or services. Other parameters and settings can be used to instantiate and operate a set of virtual machines, software, and other resources in the host clouds. One skilled in the art will realize that the user's request can likewise include combinations of the foregoing exemplary parameters, and others. It may be noted that "user" herein can include a network-level user or subscriber to cloud-based networks, such as a corporation, government entity, educational institution, and/or other entity, including individual users and groups of users.

When the request to instantiate a set of virtual machines or other resources has been received and the necessary resources to build those machines or resources have been identified, the cloud management system 104 can communicate with one or more set of resource servers 108 to locate resources to supply the required components. Generally, the cloud management system 104 can select servers from the diverse set of resource servers 108 to assemble the various components needed to build the requested set of virtual machines, services, or other resources. It may be noted that in some embodiments, permanent storage, such as optical storage or hard disk arrays, may or may not be included or located within the set of resource servers 108 available to the cloud management system 104, since the set of instantiated virtual machines or other resources may be intended to operate on a purely transient or temporary basis. In embodiments, other hardware, software or other resources not strictly located or hosted in one or more clouds 102 can be accessed and leveraged as needed. For example, other software or services that are provided outside of one or more clouds 102 acting as hosts, and are instead hosted by third parties outside the boundaries of those clouds, can be invoked by in-cloud virtual machines or users. For further example, other non-cloud hardware and/or storage services can be utilized as an extension to the one or more clouds 102 acting as hosts or native clouds, for instance, on an on-demand, subscribed, or event-triggered basis.

With the resource requirements identified for building a network of virtual machines, the cloud management system 104 can extract and build the set of virtual machines or other resources on a dynamic, on-demand basis. For example, one set of resource servers 108 may respond to an instantiation request for a given quantity of processor cycles with an offer to deliver that computational power immediately and guaranteed for the next hour or day. A further set of resource servers 108 can offer to immediately supply communication bandwidth, for example on a guaranteed minimum or best-efforts basis, for instance over a defined window of time. In other embodiments, the set of virtual machines or other resources can be built on a batch basis, or at a particular future time. For example, a set of resource servers 108 may respond to a request for instantiation of virtual machines at a programmed time with an offer to deliver the specified quantity of processor cycles within a specific amount of time, such as the next 12 hours. Other timing and resource configurations are possible.

After interrogating and receiving resource commitments from the set of resource servers 108, the cloud management system 104 can select a group of servers in the set of resource servers 108 that match or best match the instantiation request for each component needed to build the user's requested virtual machine, service, or other resource. The cloud management system 104 for the one or more clouds 102 acting as the destination for the virtual machines can then coordinate the integration of the identified group of servers from the set of resource servers 108, to build and launch the requested set of virtual machines or other resources. The cloud management system 104 can track the identified group of servers selected from the set of resource servers 108, or other distributed resources that are dynamically or temporarily combined, to produce and manage the requested virtual machine population, services, or other cloud-based resources.

In embodiments, the cloud management system 104 can generate a resource aggregation table or other record that identifies the various selected sets of resource servers in set of resource servers 108 that will be used to supply the components of the set of instantiated virtual machines, services, or processes. The selected sets of resource servers can be identified by unique identifiers such as, for instance, Internet protocol (IP) addresses or other addresses. In aspects, different sets of servers in set of resource servers 108 can be selected to deliver different resources to different users and/or for different applications. The cloud management system 104 can register the finalized group of servers in the set resource servers 108 contributing to or otherwise supporting the set of instantiated machines, services, or processes.

The cloud management system 104 can then set up and launch the initiation process to instantiate the virtual machines, processes, services, and/or other resources to be hosted and delivered from the one or more clouds 102. The cloud management system 104 can for instance transmit an instantiation command or instruction to the registered group of servers in the set of resource servers 108. The cloud management system 104 can receive a confirmation message back from each registered server in set of resource servers 108 indicating a status or state regarding the provisioning of their respective resources. Various registered resource servers may confirm, for example, the availability of a dedicated amount of processor cycles, amounts of electronic memory, communications bandwith, services, and/or applications or other software prepared to be served and delivered.

Figure 2:
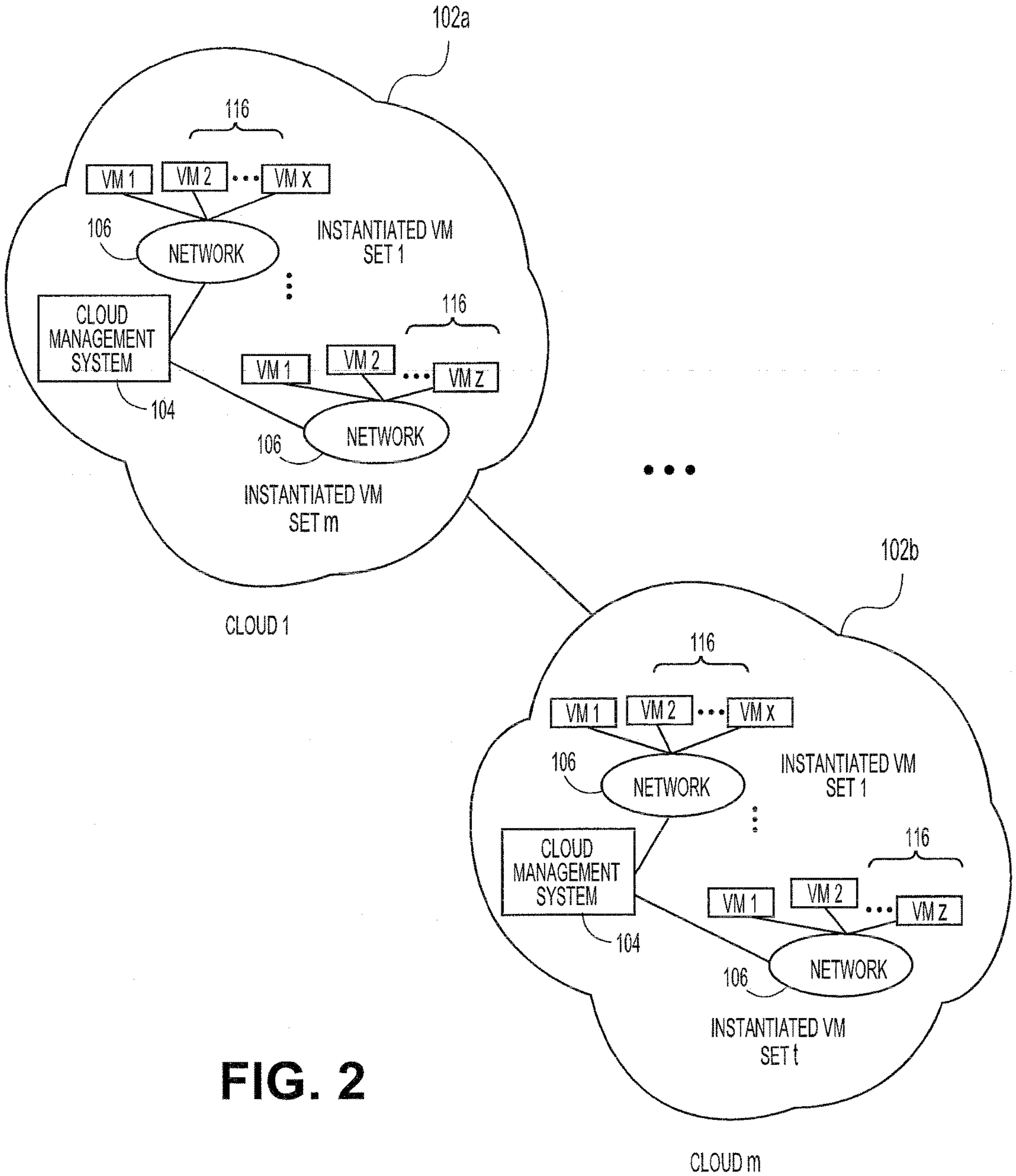
FIG. 2 illustrates an overall cloud system architecture in which various aspects of systems and methods for generating a selection of a cloud data distribution service from alternative providers for staging data to host clouds can be practiced, in further regards.

As shown for example in FIG. 2, after coordination of the sources and configuration of resources including the hardware layer, selected software, and/or other resources, the cloud management system 104 can then instantiate a set of virtual machines 116, and/or other appliances, services, processes, and/or entities, based on the resources supplied by servers within set of resource servers 108 registered to support the one or more clouds 102 in a multiple-cloud network 110. According to aspects, cloud management system 104 can access or interact with a virtualization module, platform, or service to instantiate and operate set of virtual machines 116, such as the kernel-based virtualization manager (KVM™) available from Red Hat, Inc. of Raleigh, N.C., or others. In embodiments, the cloud management system 104 can instantiate a given number, for example, 10, 500, 1000, 20,000, or other numbers or instances of virtual machines to populate one or more clouds 102 and be made available to users of that cloud or clouds. In aspects, users may access the one or more clouds 102 via the Internet, or other public or private networks. Each virtual machine can be assigned an instantiated machine ID that can be stored in the resource aggregation table, or other record or image of the instantiated virtual machine population. Additionally, the cloud management system 104 can store data related to the duration of the existence or operation of each operating virtual machine, as well as the collection of resources utilized by the overall set of instantiated virtual machines 116.

In embodiments, the cloud management system 104 can further store, track and manage each user's identity and associated set of rights or entitlements to software, hardware, and other resources. Each user that operates a virtual machine or service in the set of virtual machines in the cloud can have specific rights and resources assigned and made available to them, with associated access rights and security provisions. The cloud management system 104 can track and configure specific actions that each user can perform, such as the ability to provision a set of virtual machines with software applications or other resources, configure a set of virtual machines to desired specifications, submit jobs to the set of virtual machines or other host, manage other users of the set of instantiated virtual machines 116 or other resources, and/or other privileges, entitlements, or actions. The cloud management system 104 associated with the virtual machine(s) of each user can further generate records of the usage of instantiated virtual machines to permit tracking, billing, and auditing of the resources and services consumed by the user or set of users. In aspects of the present teachings, the tracking of usage activity for one or more user (including network level user and/or end-user) can be abstracted from any one cloud to which that user is registered, and made available from an external or independent usage tracking service capable of tracking software and other usage across an arbitrary collection of clouds, as described herein. In embodiments, the cloud management system 104 of an associated cloud can for example meter the usage and/or duration of the set of instantiated virtual machines 116, to generate subscription and/or billing records for a user that has launched those machines. In aspects, tracking records can in addition or instead be generated by an internal service operating within a given cloud. Other subscription, billing, entitlement and/or value arrangements are possible.

The cloud management system 104 can configure each virtual machine in set of instantiated virtual machines 116 to be made available to users via one or more networks 116, such as the Internet or other public or private networks. Those users can for instance access set of instantiated virtual machines via a browser interface, via an application server such as a Java™ server, via an application programming interface (API), and/or other interface or mechanism. Each instantiated virtual machine in set of instantiated virtual machines 116 can likewise communicate with its associated cloud management system 104 and the registered servers in set of resource servers 108 via a standard Web application programming interface (API), or via other calls, protocols, and/or interfaces. The set of instantiated virtual machines 116 can likewise communicate with each other, as well as other sites, servers, locations, and resources available via the Internet or other public or private networks, whether within a given cloud in one or more clouds 102, or between those or other clouds.

It may be noted that while a browser interface or other front-end can be used to view and operate the set of instantiated virtual machines 116 from a client or terminal, the processing, memory, communications, storage, and other hardware as well as software resources required to be combined to build the virtual machines or other resources are all hosted remotely in the one or more clouds 102. In embodiments, the set of virtual machines 116 or other services, machines, or resources may not depend in any degree on or require the user's own on-premise hardware or other resources. In embodiments, a user can therefore request and instantiate a set of virtual machines or other resources on a purely off-premise basis, for instance to build and launch a virtual storefront, messaging site, and/or any other application. Likewise, one or more clouds 102 can also be formed in whole or part from resources hosted or maintained by the users of those clouds, themselves.

Because the cloud management system 104 in one regard specifies, builds, operates and manages the set of instantiated virtual machines 116 on a logical or virtual level, the user can request and receive different sets of virtual machines and other resources on a real-time or near real-time basis, without a need to specify, install, or configure any particular hardware. The user's set of instantiated virtual machines 116, processes, services, and/or other resources can in one regard therefore be scaled up or down immediately or virtually immediately on an on-demand basis, if desired. In embodiments, the set of resource servers 108 that are accessed by the cloud management system 104 to support the set of instantiated virtual machines 116 or processes can change or be substituted, over time. The type and operating characteristics of the set of instantiated virtual machines 116 can nevertheless remain constant or virtually constant, since instances are assembled from a collection of abstracted resources that can be selected and maintained from diverse sources based on uniform specifications. Conversely, the users of the set of instantiated virtual machines 116 can also change or update the resource or operational specifications of those machines at any time. The cloud management system 104 and/or other logic can then adapt the allocated resources for that population of virtual machines or other entities, on a dynamic basis.

In terms of network management of the set of instantiate virtual machines 116 that have been successfully configured and instantiated, the one or more cloud management systems 104 associated with those machines can perform various network management tasks including security, maintenance, and metering for billing or subscription purposes. The cloud management system 104 of one or more clouds 102 can, for example, install, initiate, suspend, or terminate instances of applications or appliances on individual machines. The cloud management system 194 can similarly monitor one or more operating virtual machines to detect any virus or other rogue process on individual machines, and for instance terminate an application identified as infected, or a virtual machine detected to have entered a fault state. The cloud management system 104 can likewise manage the set of instantiated virtual machines 116 or other resources on a network-wide or other collective basis, for instance, to push the delivery a software upgrade to all active virtual machines or subsets of machines. Other network management processes can be carried out by cloud management system 104 and/or other associated logic.

In embodiments, more than one set of virtual machines can be instantiated in a given cloud at the same time, at overlapping times, and/or at successive times or intervals. The cloud management system 104 can, in such implementations, build, launch and manage multiple sets of virtual machines as part of the set of instantiated virtual machines 116 based on the same or different underlying set of resource servers 108, with populations of different virtual machines such as may be requested by the same or different users. The cloud management system 104 can institute and enforce security protocols in one or more clouds 102 hosting one or more sets of virtual machines. Each of the individual sets or subsets of virtual machines in the set of instantiated virtual machines 116 can be hosted in a respective partition or sub-cloud of the resources of the main cloud 102. The cloud management system 104 of one or more clouds 102 can for example deploy services specific to isolated or defined sub-clouds, or isolate individual workloads/processes within the cloud to a specific sub-cloud or other sub-domain or partition of the one or more clouds 102 acting as host. The subdivision of one or more clouds 102 into distinct transient sub-clouds, sub-components, or other subsets which have assured security and isolation features can assist in establishing a multiple user or multi-tenant cloud arrangement. In a multiple-user scenario, each of the multiple users can use the cloud platform as a common utility while retaining the assurance that their information is secure from other users of the same one or more clouds 102. In further embodiments, sub-clouds can nevertheless be configured to share resources, if desired.

In embodiments, and as also shown in FIG. 2, the set of instantiated virtual machines 116 generated in a first cloud in one or more clouds 102 can also interact with a set of instantiated virtual machines, services, and/or processes generated in a second, third or further cloud in one or more clouds 102, comprising a multiple-cloud network 110. The cloud management system 104 of a first cloud of one or more clouds 102 can interface with the cloud management system 104 of a second, third, or further cloud of one or more clouds 102 to coordinate those domains and operate the clouds and/or virtual machines, services, and/or processes on a combined basis. The cloud management system 104 of a given cloud on one or more clouds 102 can in aspects track and manage individual virtual machines or other resources instantiated in that cloud, as well as the set of instantiated virtual machines or other resources in other clouds.

In the foregoing and other embodiments, the user making an instantiation request or otherwise accessing or utilizing the cloud network can be a person, customer, subscriber, administrator, corporation, organization, government, and/or other entity. In embodiments, the user can be or include another virtual machine, application, service and/or process. In further embodiments, multiple users or entities can share the use of a set of virtual machines or other resources.

In aspects, the cloud management system 104 and/or other logic or service that manages, configures, and tracks cloud activity can be configured to interact with other sites, platforms, engines, servers, and/or associated services that are configured to organize and manage the transport and delivery of existing data stores from on-premise databases or other sources, and stage that data to data storage resources at, near, co-hosted, or otherwise in geographic proximity to a set of host storage clouds in which that data payload will be placed and stored. In aspects, the cloud distribution data service (which may be referred to as "CDD", "CDD service," "data delivery service," or other references herein) can be located at the network edge to either or both of the premise data sources, and/or the set of host storage clouds. In aspects, this staging or staggering of potentially large-scale or very large-scale data stores can permit the connection between the data source(s), intermediate or staged data stores, and/or the host cloud data stores using dedicated and/or high-bandwidth lines, channels, or connections to permit the efficient and timely porting of that data to a host storage cloud or clouds of the user's choice. In aspects, the data payload or portions thereof can be located, extracted and transmitted as an image or copy of the subject data, with the original cloud-hosted being preserved in the set of host storage clouds. In aspects, the data payload and/or portions thereof can be located, extracted, and transmitted without leaving the original data stored in the set of host storage clouds, such as by deleting that data upon reading-out, or using other techniques.

Figure 3:
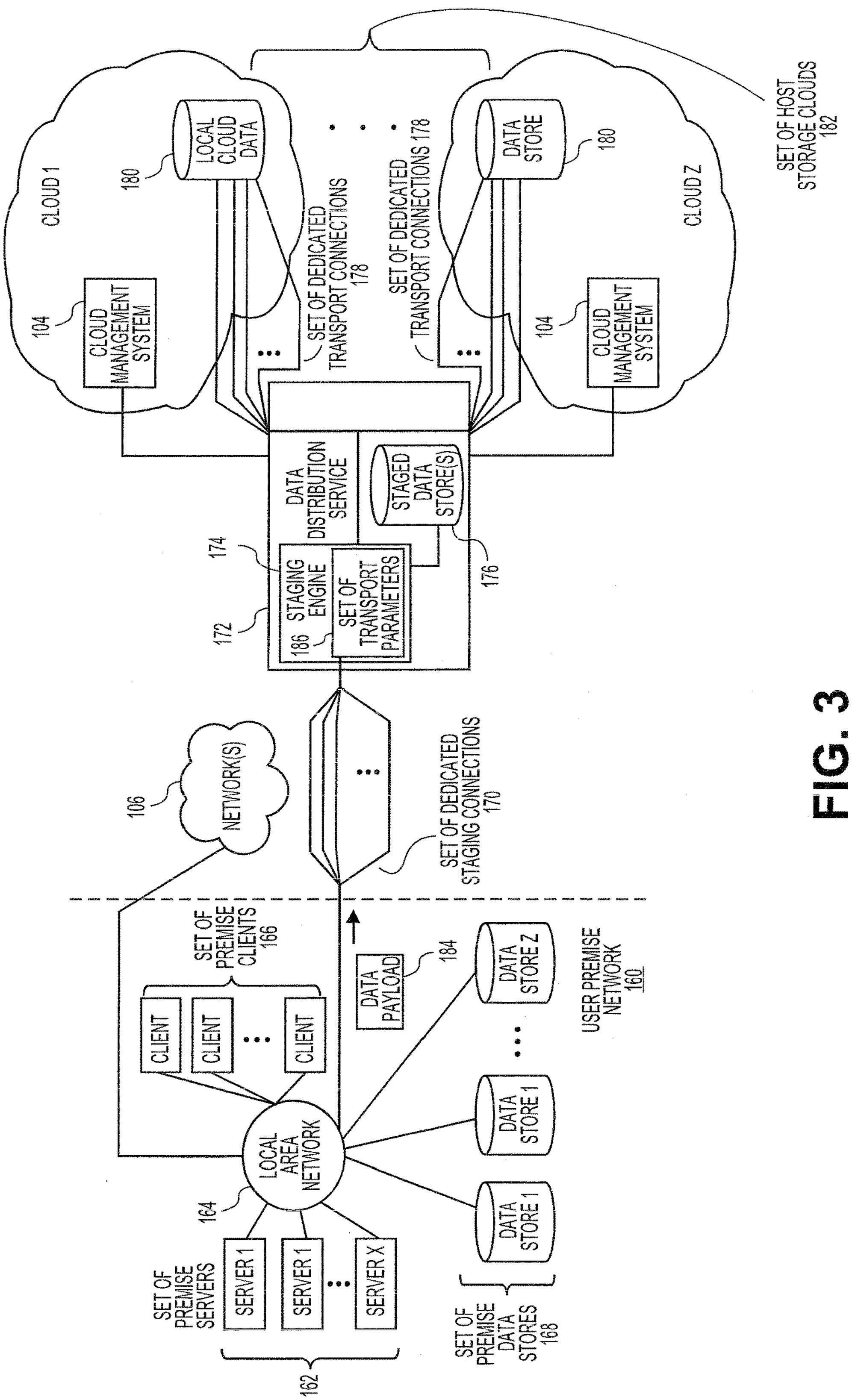
FIG. 3 illustrates a network configuration in which a data distribution service can be established between a premise network and host storage cloud, according to various embodiments.

In those regards, FIG. 3 illustrates a network implementation in which, in various cases, an administrator, owner, operator, and/or other user of a premise network 160 may wish to consider identifying, collecting, and migrating or transporting their databases, data files, and/or other data assets to a set of host storage clouds 182. In aspects and merely illustratively, the premise network 160 can contain or include on-premise, bare-metal, and/or other virtual or physical assets including a set of premise servers 162, a set of premise clients 166, one or more local area networks (LANs) 164 such as an Ethernet™ or Wifi™ network, a virtual private network (VPN), and/or other networks or connection topologies. The premise network 160 can include or interface to one or more networks 106, such as the public Internet and/or other public or private networks.

The premise network 160 can likewise include a set of premise data stores 168, such as one or more databases, data stores, servers, redundant arrays of inexpensive disks (RAID) installations, optical or solid-state storage or devices, and/or other data storage repositories, resources, or assets. In aspects, the set of premise data stores 168 can store different types of data, including, for example, technical, medical, financial, scientific, and/or other data. The data hosted or stored in the set of premise data stores 168 can comprise significantly or substantially large-scale data, for example data or files comprising terabytes or other amounts of data. For instance, the administrator, owner, operator, and/or other user of a corporation, hospital, educational institution, government body, and/or other entity may collect and maintain a set of data in a set of premise data stores 168 such as local databases, data centers, database files and/or engines, repositories, and/or other data assets, services, and/or other storage sites of resources. In cases, the set of premise data stores 168 can host and store a significant or substantial amount of data, such as terabytes, petabytes, exabytes, yottabytes, and/or other amounts of data. In aspects, the administrator, owner, operator, and/or other user responsible for hosting and/or maintaining that data in the set of premise data stores 168 may, for various reasons, wish to migrate some or all of that constituent data to one or more local cloud data stores 180 in the set of host storage clouds 182, such as to leverage cost, maintenance, capacity, security, and/or other advantages or factors available in the set of host storage clouds 182.

In aspects, it can be the case that if the owner, administrator, and/or other user of the user premise network 160 attempted to transport a significant amount of the data stored in the set of premise data stores 168 via one or more networks 106 such as the Internet in an unmanaged fashion, the comparatively low bandwidth or lack of reliability in the packet-switched public Internet could render the data transfer difficult, impractical, unfeasible, or impossible due to the limitations of those types of channels or connections. The upload of terabytes or other amounts of data over public Internet or similar connections could require days of time or more, and data integrity or reliability issues could also affect the effectiveness of data migration attempted in that manner.

According to aspects, systems and methods for staged data migration between data sources and cloud-based storage networks according to the present teachings can be deployed to assist in reducing, avoiding, or eliminating those and other types of performance degradations and other factors having a potential impact on the transport of data from on-premise and/or other sources to the set of host storage clouds 182 and/or other cloud-based storage assets, services, or resources. In implementations of the present teachings, a data distribution service 172 can accordingly be established or deployed as an independent service or access point, available publicly or privately to potential subscribers to the set of host storage clouds 182, to condition, prepare, receive, and stage incoming data payloads or data sets for delivery to an eventual cloud storage host, using enhanced, dedicated, and/or otherwise managed connections to reduce data transport time, to improve transfer reliability and/or security, and/or to provide other factors or benefits. In aspects, the data distribution service 172 can establish or maintain physical points of presence (PoPs) and/or other connections to one or more networks 106, such as the Internet and/or other public or private networks, through which users or potential users can connect to the data distribution service 172 and its associated resources, logic, and services. According to aspects, the data distribution service 172 can host or execute a staging engine 174 that can contain software application, operating system, and/or other logic or resources to manage the transport and delivery of a data payload 184 from the set of premise data stores 168 and/or other sources to a set of host storage clouds 182. In aspects, the data distribution service 172 can be configured to communicate directly or indirectly with the cloud management system 104 of each of the set of host storage clouds 182, for instance via the Internet and/or other public or private networks or connections. In aspects, the data distribution service 172 can also maintain a set of staged data stores 176, such as databases, data stores, servers, and/or other data assets or resources with which to store and stage the data payload 184 for migration into one or more local cloud data stores 180 hosted in the set of host storage clouds 182. In aspects, each cloud in the set of host storage clouds 182 can host one or multiple local cloud data stores 180.

According to implementations of the present teachings in certain regards, the data distribution service 172 can operate to manage, organize, and/or enhance or optimize the transfer of the data payload 184 from the set of premise data stores 168 and/or other sources by staggering, staging, pre-staging, conditioning, and/or otherwise manipulating and administering the transfer of the data payload 184 to the set of staged data stores 176 via sets of selectable and/or configurable channels or connections. In aspects, those channels or connections can be or include a set of dedicated staging connections 170 that connect the user premise network 160 to the data distribution service 172 and the set of staged data stores 176. In aspects, the set of dedicated staging connections 170 can be or include any one or more of asynchronous transfer mode (ATM) networks or connections, wide area networks (WANs) or connections, metropolitan area networks (MANs) or connections, fiber optical connections such as synchronous optical networking (SONET) or synchronous digital hierarchy (SDH) connections, wireless connections, cable or wireline connections, virtual private networks (VPNs) or connections, and/or other channels or connections. In aspects, the connections in the set of dedicated staging connections 170 can be or include channels or connections can having a relatively high-capacity bandwidth or service level, such as for instance tens of megabytes per second, hundreds of megabytes per second, gigabytes per second, tens of gigabytes per second, hundreds of gigabytes per second, terabytes per second, and/or other data transfer rates or bandwidth ratings or capacities. In aspects, any one or more of the connections or channels in the set of dedicated staging connections 170 can comprise connections which are leased by a user on a temporary, demand-triggered, long-term, and/or other basis. And one or more of the connections or channels in the set of dedicated staging connections 170 can be or include permanent or dedicated channels, line, and/or connections, dynamically routed or configured channels or connections, and/or other channels or connections.

In aspects, the administrator, owner, operator, and/or other user of the user premise network 160 can specify a set of conditions, criteria, and/or other parameters to govern the transport of the data payload 184 during delivery to the data distribution service 172 and/or to the eventual set of host storage clouds 182, which information can be stored or encoded in a set of transport parameters 186, which can be stored in the staging engine 174 and/or other locations or stores. The set of transport parameters 186 can, for instance, specify a total amount of data to be include in the data payload 184 for delivery to the data distribution service 172, as well as a schedule over which or time by which the administrator, owner, operator, and/or other user wishes to conduct and complete the migration of the data payload 184 to the data distribution service 172. The set of transport parameters 186 can likewise include cost specifications, for instance, in cases where the cost of leasing or using any of the set of dedicated staging connections 170 is selectable or variable. The set of transport parameters 186 can also include further configuration parameters, such as any security or redundancy protocols or standards that the administrator, owner, operator, and/or other user wishes to apply to the transport of the data payload to the data distribution service 172, user access controls to the data payload 184 before or after transport has been initiated or completed. Other parameters, configuration settings, commands, scripts, and/or other criteria, variables, or conditions can be specified or indicated in the set of transport parameters 186.

As a merely illustrative example, the administrator, owner, operator, and/or other user can enter or encode the set of transport parameters 186 to indicate that a data transport event is desired to migrate the data payload 184 from the user premise network 160 under criteria that 1,000 terabytes of data is to be transported by an ending time of 12:00 midnight on a specified data, at an average cost of not more than $0.25 per megabyte and with the data payload 184 encrypted using the Data Encryption Standard (DES) and/or other encryption or security protocol, and with the data payload 184 to be stored in the set of staged data stores 176 of the data distribution service 172 in XML (extensible markup language) or other format. The set of transport parameters 186 can be selected, entered, and/or otherwise transmitted from the user premise network 160 or other site to the data distribution service 172, for instance via a selector tool, Web browser, and/or other application or interface. The set of transport parameters 186 can, in aspects, in whole or part specify the set of dedicated staging connections 170 to be used for delivery of the data payload 184 and/or associated information to the data distribution service 172, for instance via manual selection or input received from the administrator, owner, operator, and/or other user.

In aspects, the data payload 184 and/or associated information can be migrated or transported partly or entirely via the set of dedicated staging connections 170. For instance, in cases, the administrator, owner, operator, and/or other user may transmit some of the data payload 184 and/or associated information via the one or more networks, in addition to the set of dedicated staging connections 170. For example, configuration commands, the set of transport parameters 186 or portions of or updates to the set of transport parameters 180, can be transmitted via the one or more networks 106, for instance via the public Internet, since in aspects comparatively higher-bandwidth connections may not be necessary to transmit relatively small amounts of commands and/or data or elements of the data. In cases, the one or more networks 106 can in addition or instead transport at least a portion of the data payload 184, for instance, to transmit supplemental data or attributes whose delivery target time is not immediate or a high priority. Other combinations of the one or more networks 106, the set of dedicated staging connections 170, other networks or connections, and/or combinations thereof can be used.

In aspects, after transport of the data payload 184 to the set of staged data stores 176 of the data distribution service 172 has been completed, the data distribution service 172 can finalize the installation, storage, and/or hosting of the data payload 184 and/or associated information in the one or more local cloud data stores 180 before initiating activities related to further transport of the data payload 184 to the one or more local cloud data stores 180 of one or more of the set of local host storage clouds 182. The data distribution service 172 can store, host, and maintain the data payload 184 in the set of staged data stores 176 for temporary, short-term, and/or longer or other periods, depending on the set of transfer parameters 186 and/or other factors. For instance, the staging engine 174 of the data distribution service 172 can determine that the administrator, owner, operator, and/or other user has specified or requested that the transfer of the data payload 184 into the one or more local cloud data stores 180 of one or more of the set of local host storage clouds 182 be initiated by 9:00 p.m. on a certain date. To satisfy that scheduling criterion, the staging engine 174 can identify the size and/or type of data in the data payload 184, analyze or estimate the bandwidth available in the set of dedicated staging connections 170, and set a target delivery completion time of 11:00 p.m. on the specified delivery date, taking into account the interval of time that will be necessary to transport the data payload 184 over the available bandwidth of the selected channels in the set of dedicated staging connections 170 to complete transfer of the data payload 184 by 11:00 p.m. on that scheduled date. If the transport process proceeds to complete by the calculated completion time of 11:00 p.m. on that date, the data of the data payload 184 and/or any associated information can accordingly reside in the set of staged data stores 176 of the data distribution service 172 for one hour before the staging engine 174 initiates the further or next-stage migration or transport of the data payload 184 to the one or more local cloud data stores 180 of one or more of the set of local host storage clouds 182. The set of staged data stores 176 of the data distribution service 172 can host the data payload 184 and/or associated information for lesser or greater amounts of times, for instance, for periods of minutes, hours, days, weeks, months, and/or other periods or intervals, depending on the set of transfer parameters 186 and/or other factors. For instance, in an illustrative implementation involving payload data 184 including enterprise resource planning (ERP) data related to a chemical or automotive factory, the manufacturing data, materials deliveries and costs, factory repair or maintenance events or schedules, and/or other data may be tracked, stored, and updated on a monthly cycle. In those or other implementations, the administrator, owner, operator, and/or other user may specify that the data payload 184 encapsulating that ERP and/or other data can or should be migrated over a period of 30 days and/or before the next regular update cycle, in which case the data distribution service 172 may determine that the data payload 184 can be extracted to the data distribution service 172 over a period of 30 days, for instance so as to use a comparatively lower amount of bandwidth in the set of dedicated staging connections 170 and thereby incur less connection leasing costs. In cases where the set of staged data stores 176 of the data distribution service 172 stores, hosts, and/or maintains the data payload 184 over significant intervals of time, such as days or weeks of time, and/or other intervals or periods, the data distribution service 172 can also apply or enforce data conditioning or maintenance standards or procedures on the data payload 184 or other information. For example, in cases where the data payload 184 includes medical information, the data distribution service 172 can apply user access controls such as username/password authentication and/or data encryption, for instance to satisfy the requirements of the Health Insurance Portability and Accountability Act (HIPPA), the requirements of the Sarbanes-Oxley Act (SOX), and/or other security, regulatory, or compliance stipulations or requirements. Other compliance, management, and/or security protocols can be applied to the data payload 184 and/or other information stored in the set of staged data stores 176 of the data distribution service 172, regardless of the duration of time that information is staged in the data distribution service 172. For instance, during the period that the data payload 184 resides or is hosted in the data distribution service 172, the data distribution service 172 can also communicate with the user premise network 160 to interrogate that source network for any incremental or other updates to the data payload 184, and incorporate those updates into the data payload 184 stored in the set of staged data stores 176 of the data distribution service 172. Other data conditioning or processing can be performed on the data payload 184 while hosted or stored in the set of staged data stores 176 of the data distribution service 172.

In aspects, the data distribution service 172 can be installed, configured, and/or located in geographic proximity to the set of host storage clouds 182, the one or more local cloud data stores 180, and/or other network elements or sites. As used or described in this application, in aspects, locations within geographic proximity to each other can be or include locations or sites located within the same city or metropolitan area, and/or within the same general region, such as within a state in the U.S. and/or a multi-state region generally recognized as constituting a cohesive geographic region, such as, merely for example, the New York-New Jersey-Connecticut tri-state area, and/or others. In aspects, locations within geographic proximity to each other can also or instead be or include areas or regions within which direct, continuous, connectable, configurable, leasable, primary, and/or otherwise uninterrupted or unmediated physical or wireless connections are available to establish communications links between two or more network points, sites, and/or entities within a geographic region, section, and/or area. In aspects, network sites, points including physical points of presence (PoPs), and/or other elements can be considered to be within geographic proximity to each other is those sites or points can be connected directly or essentially directly via comparatively high-bandwidth channels or connections, and/or without resorting to connections via the public Internet. For example, network sites, points including physical points of presence (PoPs), and/or other elements can be considered to be within geographic proximity to each other if those sites, points, and/or other elements can be connected directly or essentially directly via one or more wide area networks (WANs), metropolitan area networks (MANs), optical connections such as synchronous optical network (SONET) connections, and/or other comparatively high-bandwidth channels or connections, as will be understood by persons skilled in the art. While in aspects network sites, points including physical points of presence (PoPs), and/or other elements can be considered as being within geographic proximity based on various physical, functional, and/or logical factors, in aspects, and purely illustratively, network sites, points including physical points of presence (PoPs), and/or other elements that can be classified or considered as being within geographic proximity can be located within distances of miles, tens of miles, hundreds of miles, and/or lesser or greater distances of each other. In aspects, in noted instances and others, geographic proximity can also encompass or include network proximity between the premise network 160 and the data distribution service 172, and/or between the data distribution service and set of host storage clouds 182, in the sense of being within range or being connectable via comparatively high-bandwidth connections or channels. Other factors, parameters, criteria, and/or considerations can be used to determine geographic proximity between network sites, points including physical points of presence (PoPs), and/or other elements as described herein.

Upon meeting, reaching, and/or otherwise satisfying the scheduled time, criteria, and/or conditions to initiate the further transfer of the data payload 184 and/or associated information to the set of host storage clouds 182, the data distribution service 172 and/or other logic or service can begin the processing to migrate that data or information to the one or more local cloud data stores 180 of one or more clouds in the set of host storage clouds 182. In aspects, the delivery of the data payload 184 and/or associated information to the set of host storage clouds 182 can be initiated at a scheduled time, such as a time specified in the set of transport parameters 186 and/or other commands or configuration data. In aspects, the delivery of the data payload 184 and/or associated information to the set of host storage clouds 182 can be initiated on an event-triggered basis, such as one hour or one day after completion of the transport of the data payload 184 to the data distribution service 172. In aspects, the delivery of the data payload 184 and/or associated information to the set of host storage clouds 182 can also or instead be initiated by manual selection or command, for instance, by a selection or command inputted by the administrator, owner, operator, and/or other user. Other conditions, commands, schedules, events, and/or criteria can be used to identify a time at which to begin, pause, continue, and/or otherwise deliver the data payload 184 and/or associated information from the data distribution service 172 to the one or more local cloud data stores 180 of one or more clouds in the set of host storage clouds 182.

In aspects, the data payload 184 and/or other information can be transported or transmitted from the data distribution service 172 to the set of host storage clouds 182 via a set of dedicated transport connections 178. In aspects, the set of dedicated transport connections 178 an connect the set of staged data stores 176 directly or indirectly to the one or more local cloud data stores 180 to migrate and install the data payload 184 and/or associated information in the one or more local cloud data stores 180. In aspects, the set of dedicated transport connections 178 can be or include connections or channels of the same general type or types as the set of dedicated staging connections 170, and/or can include additional, separate, and/or different channels or connections. In aspects, the set of staged data stores 176 can be located within geographic proximity or near-geographic proximity, in the senses noted herein, to one or more of the clouds in the set of host storage clouds 182 and/or the constituent elements of those clouds, including the cloud management system(s) 104 and/or one or more local cloud data stores 180. In aspects, the staging engine 174 and/or other logic or service can initiate and manage the transfer of the data payload 184 and/or image thereof stored or hosted in the set of staged data stores 176 to the one or more local cloud data stores 180 via the set of dedicated transport connections 178 on a scheduled, event-triggered, manually-specified, and/or other basis. The migration or transport of the data payload 184 and/or associated data can for instance be programmed to begin at a specified time on a specified date, and/or to begin upon the detection of specified events, such as validation of the data payload 184 and/or associated data using error correction, decryption, and/or other processing or protocols. In aspects, the migration or transport of the data payload 184 and/or associated data can be initiated by receipt of a command, input, and/or other signal from the administrator, owner, operator, and/or other user, for instance, received via a tool, interface, or browser operated by the admin in the user premise network 160 and/or other location or site.

After the transfer of the data payload 184 and/or other associated data has been initiated, the staging engine 174 and/or other logic or service can monitor the transport of that data while in-flight, for instance, to perform data validation of migrated data using for instance check-sum or other processing, encryption/decryption of the data while traversing the set of dedicated transport connections 178, and/or to perform other supervisory or monitoring tasks to ensure the integrity of the data being moved and the migration process. After the successful completion of all data transport, validation, security, and/or other processing required for migration of the data payload 184 and/or related information, the staging engine 174 can detect, confirm, and/or declare the completion of the transfer of the data payload 184 and/or associated information to the set of host storage clouds 182. In aspects, the staging engine 174, one or more cloud management system(s) 104, and/or other logic can store and/or encode the data payload 184 and/or associated information in the one or more local cloud data stores 180 in various formats or configurations, such as, for example, any one or more of a database including relational databases, an object-oriented data object such as an extensible markup language (XML)-based object, a table, tree, linked list, and/or other data object, format, file, and/or configuration. In aspects, the staging engine 174 can also perform any post-transfer activities that may be selected or required to complete the installation and storage of the data payload 184 and/or related information in the set of host storage clouds 182. In aspects, for instance, the staging engine 174 and/or other logic or service can communicate with the user premise network 160 to indicate that the data payload 184 and/or associated information has been safely and/or completely migrated to the data distribution service 172, upon which notification the user premise network 160 can perform other actions, such as to delete and/or archive the data of the data payload 184 from the set of premise data stores 168. Other actions can be taken by or in the user premise network 160.

For instance, upon completion of the data transport process, the staging engine 174 and/or other logic or service can likewise communicate with the cloud management system(s) 104 of one or more of the set of host storage clouds 182 to notify the one or more cloud management system(s) 104 of the installation and presence of the data payload 184 and/or associated data in the one or more local cloud data stores 180 of one or more of the clouds in the set of host storage clouds 182.

In aspects, after the successful or completed transport of the data payload 184 and/or associated information to the set of host storage clouds 182, the staging engine 174, cloud management system(s) 104, and/or other logic or service can for instance register the data payload 184 and/or associated data in the file storage system or systems used by the one or more cloud management system(s) 104 and/or set of host storage clouds 182. In aspects, registration of the data payload 184 and/or associated data in corresponding file storage system or systems maintained or operated by the one or more cloud management system(s) 104 and/or set of host storage clouds 182 can permit, for instance, virtual machines, operating systems, applications, and/or other software, services, and/or users of the set of host storage clouds 182 and/or other clouds or networks to access, read, retrieve, write, modify, and/or otherwise process the data payload 184 and/or associated information directly from or via the set of host storage clouds 182. In aspects, the staging engine 174 and/or other logic or service can at such times or at other times de-activate, release, and/or otherwise terminate some or all of the set of dedicated staging connections 170 and/or set of dedicated transport connections 178, as desired or scheduled.

According to aspects of the present teachings, in cases or scenarios, there may be multiple data distribution services available to an administrator, operator, and/or other user of the user premise network 160. That is, more than one data distribution service 172 may be installed, hosted, and/or operating within an area in which the user premise network 160 can communicate and/or couple to those multiple services, such as for example a situation in which the user premise network 160 lies within geographic proximity to two or more (possibly many) data distribution services, such as the illustrated data distribution service 172. In such cases and others, and as for example illustrated in FIG. 4, the user premise network 160 can be connected to and/or communicate with a set of alternative data distribution services 194. In aspects, the user premise network 160 can be connected and/or be connectable to some or all of the set of alternative data distribution services 194 through a respective set of dedicated staging connections 170, of types as described generally herein and/or others. In aspects, some or all of the data distribution services in the set of alternative data distribution services 194 can be located within geographic proximity of the user premise network 160 and/or other data source. In aspects as shown, the set of alternative data distribution services 194 can comprise a plurality of data distribution services including, merely illustratively, a first data distribution service 192 and a last data distribution service 204, with potentially other data distribution services in addition and/or between those two illustrative service instances. According to aspects, the administrator, operator, and/or other user can interact with the set of alternative data distribution services 194 via a storage management engine 196 that be incorporated in and/or be associated with the user premise network 160. In aspects the storage management engine 196 can be hosted in and/or execute on a client, workstation, and/or terminal, and/or can be provided or accessed via a Web site or service, for use in identifying and interacting with the set of alternative data distribution services 194 to configure data staging or data transport activity to transfer the data payload 184 extracted from the user premise network 160 to individual data distribution services in the set of alternative data distribution services 194. According to aspects, the storage management engine 196 can maintain and/or access a service directory 210 to locate or identify one or more of the data distribution services in the set of alternative data distribution services 194, such as by network address and/or other values or identifiers.

Figure 4:
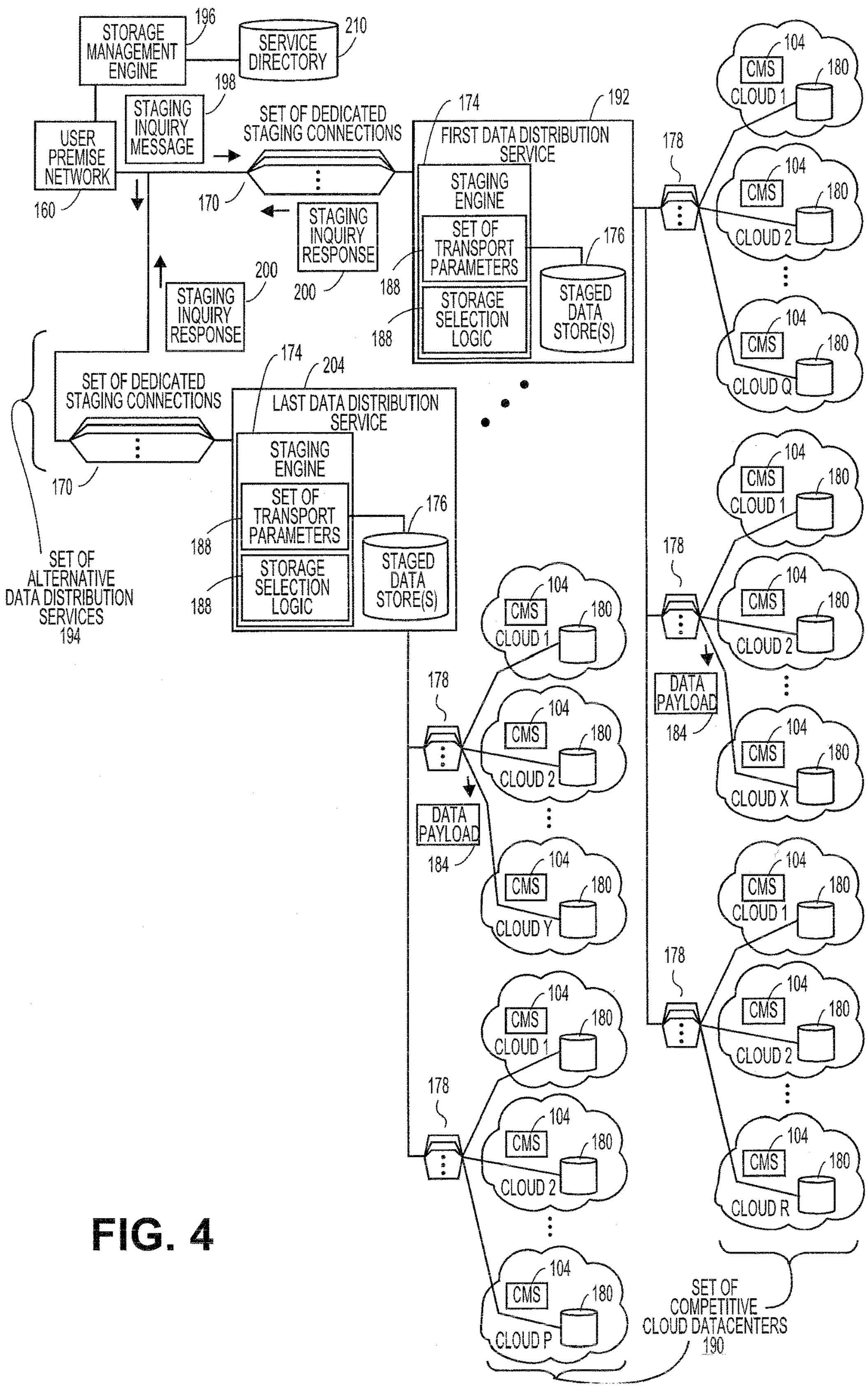
FIG. 4 illustrates a network configuration in which multiple or alternative data distribution platforms can communicate with a user premise network or other data source to offer competitive data staging services to the user.

In aspects and as likewise shown in FIG. 4, each of the data distribution services in the set of alternative data distribution services 194 available to the user premise network 160 can have an associated set of competitive cloud data centers 190 with which the respective data distribution service communicates via a set of dedicated transport connections 178. In aspects, different sets or groupings of clouds in the set of competitive cloud data centers 190 can be owned, maintained, administered, and/or otherwise operated by different entities, such as corporations operated on a marketplace and/or otherwise competitive basis to seek to obtain a selection of that cloud for receipt and hosting of the data payload 184, and/or other storage assignments.

In terms of the discovery and identification process of one or more data distribution services that the administrator and/or other user of the user premise network 160 may wish to consider or choose for data transport operations, in aspects, that user can generate a staging inquiry message 198 via the storage management engine 196 to query or interrogate data distribution services that may be available to the user premise network 160. In aspects, the staging inquiry message 198 can include commands, specifications, queries, and/or other information or data representing the data transport requirements for extracting and uploading the data payload 184 to one or more of the set of alternative data distribution services 194. In aspects, the staging inquiry message 198 can, for instance, indicate a size or expected size of the data payload, such as 5,000 terabytes or other value, the required delivery date, time, and/or schedule for uploading the data payload 184 to the selected one or more data distribution services, a set of cost parameters for the transport of the data payload 184 to one or more of the set of alternative data distribution services 194 and hosting of the data payload 184 in that service or services, security requirements for the data payload 184 while hosted, format requirements for the storage of the data payload 184, and/or other parameters, requirements, configuration settings, and/or data or attributes related to the data payload 184 and/or the delivery of that data to one or more services in the set of alternative data distribution services 194. In aspects, the staging inquiry message 198 can be or include After the set of alternative data distribution services 194 receives the staging inquiry message 198, one or more data distribution services in that set of services can generate and transmit a staging inquiry response 200 to the storage management engine 196, indicating the ability of the service or services to satisfy the requirements specified in the staging inquiry message 198. The responding data distribution service or services can for instance include a cost quote, delivery schedule, value-added services, and/or other details in the respective staging inquiry response 200. In aspects, and as described herein, the storage management engine 196 can undertake an analysis of the collected staging inquiry responses 200 received from the set of alternative data distribution services 194, for instance to rate, weight, or rank those responses to determine an order of preference for selecting those rated services to transport the data payload 184 to those respective data distribution services, before transferring the data payload 184 to one or more host storage clouds in the set of competitive cloud datacenters 190 and/or other cloud storage target(s). Ratings can be based, merely for instance, based on cost, capacity, schedule, security, and/or other factors or variables contained in the staging inquiry response 200 collected from each responding service in the set of alternative data distribution services 194. In aspects, after analyzing and selecting one or more of the set of alternative data distribution services 194, the transport of the data payload 184 to the selected data distribution service or services can be initiated, managed, and/or completed, according to processes, platforms, and techniques described herein, and/or others. In aspects, the data payload 184 can then be hosted in the selected one or more of the set of alternative data distribution services 194, again according to processes, platforms, and techniques described herein, and/or others. After completion of staging operations to the selected one or more of the set of alternative data distribution services 194, transport of the data payload 184 to the storage facilities of the set of competitive cloud datacenters 190 can be initiated, likewise using processes, platforms, and techniques described herein, and/or others. According to aspects, delivery and transport of further or downstream data payloads from the user premise network 160 can be made using the same selected service or services in the set of alternative data distribution services 194, and/or can proceed by generating a further staging inquiry message 198 and conducting additional analysis of one or more further staging inquiry response 200.

Figure 5:
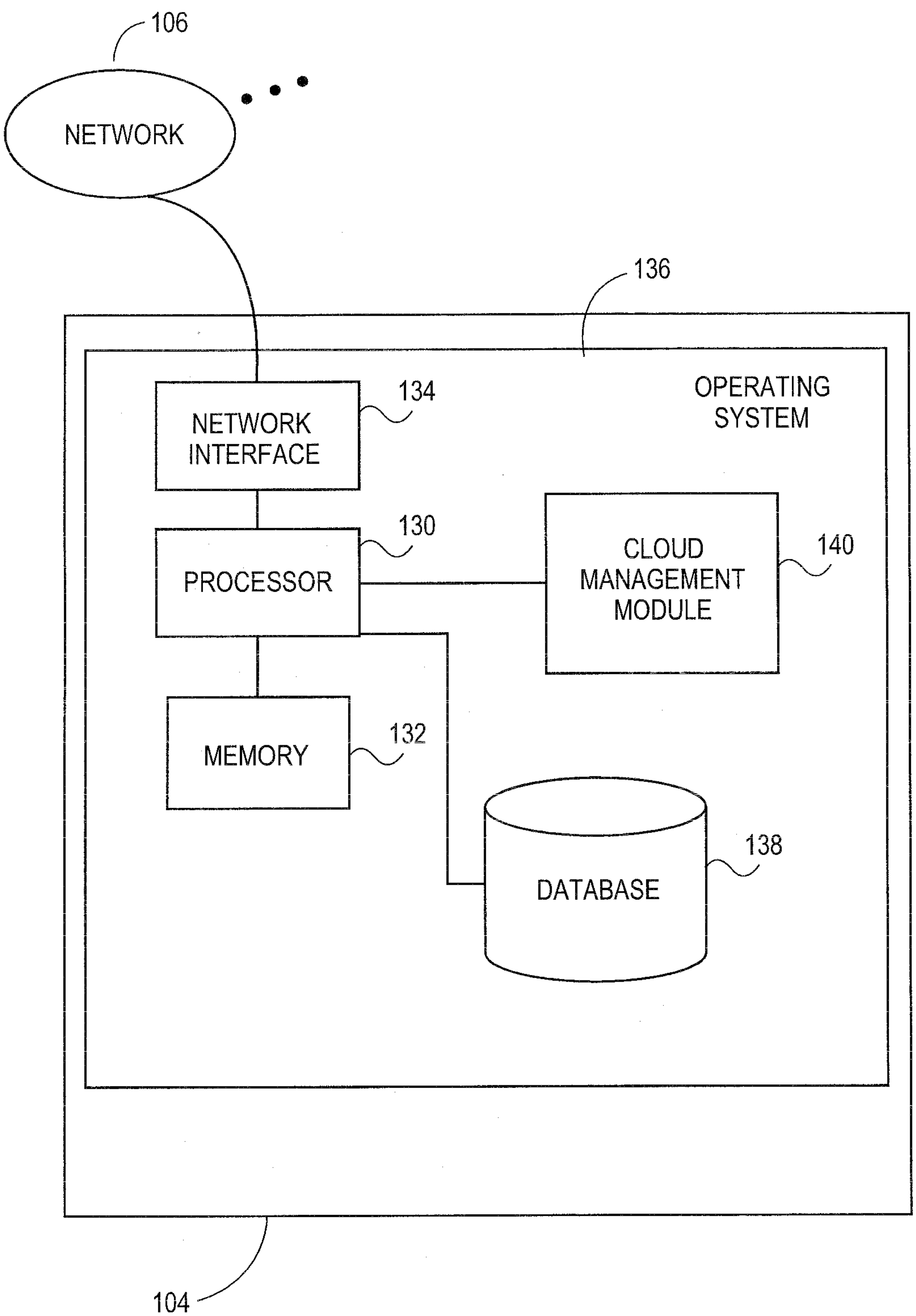
FIG. 5 illustrates an exemplary hardware configuration for a cloud management system that can support and maintain one or more cloud-based networks, according to various embodiments.

FIG. 5 illustrates an exemplary diagram of hardware and other resources that can be incorporated in a cloud management system 104 configured to communicate with the set of instantiated virtual machines 116, and/or other entities, services, or resources via one or more networks 106 and/or other connections, according to embodiments. In embodiments as shown, the cloud management system 104 can comprise a processor 130 communicating with memory 132, such as electronic random access memory, operating under control of or in conjunction with an operating system 136. The operating system 136 can be, for example, a distribution of the Linux™ operating system, the Unix™ operating system, or other open-source or proprietary operating system or platform. The processor 130 also communicates with a cloud store 138, such as a database stored on a local hard drive, and a management engine 128, to execute control logic and control the operation of virtual machines and other resources in one or more clouds 102, the set of target clouds 152, and/or other collections of clouds. The processor 130 further communicates with a network interface 134, such as an Ethernet or wireless data connection, which in turn communicates with the one or more networks 106, such as the Internet or other public or private networks. The processor 130 and/or the cloud management system 104 can likewise communicate with workload management module 140, and/or other interfaces, applications, services, and/or logic. Other configurations of the cloud management system 104, associated network connections, and other hardware, software, and service resources are possible. It may be noted that in embodiments, the data distribution service 172 and/or components thereof such as the staging engine 174, and/or other hardware machines, platforms, or engines can comprise the same or similar resources as cloud management system 104, or can be configured with different hardware and software resources.

Figure 6:
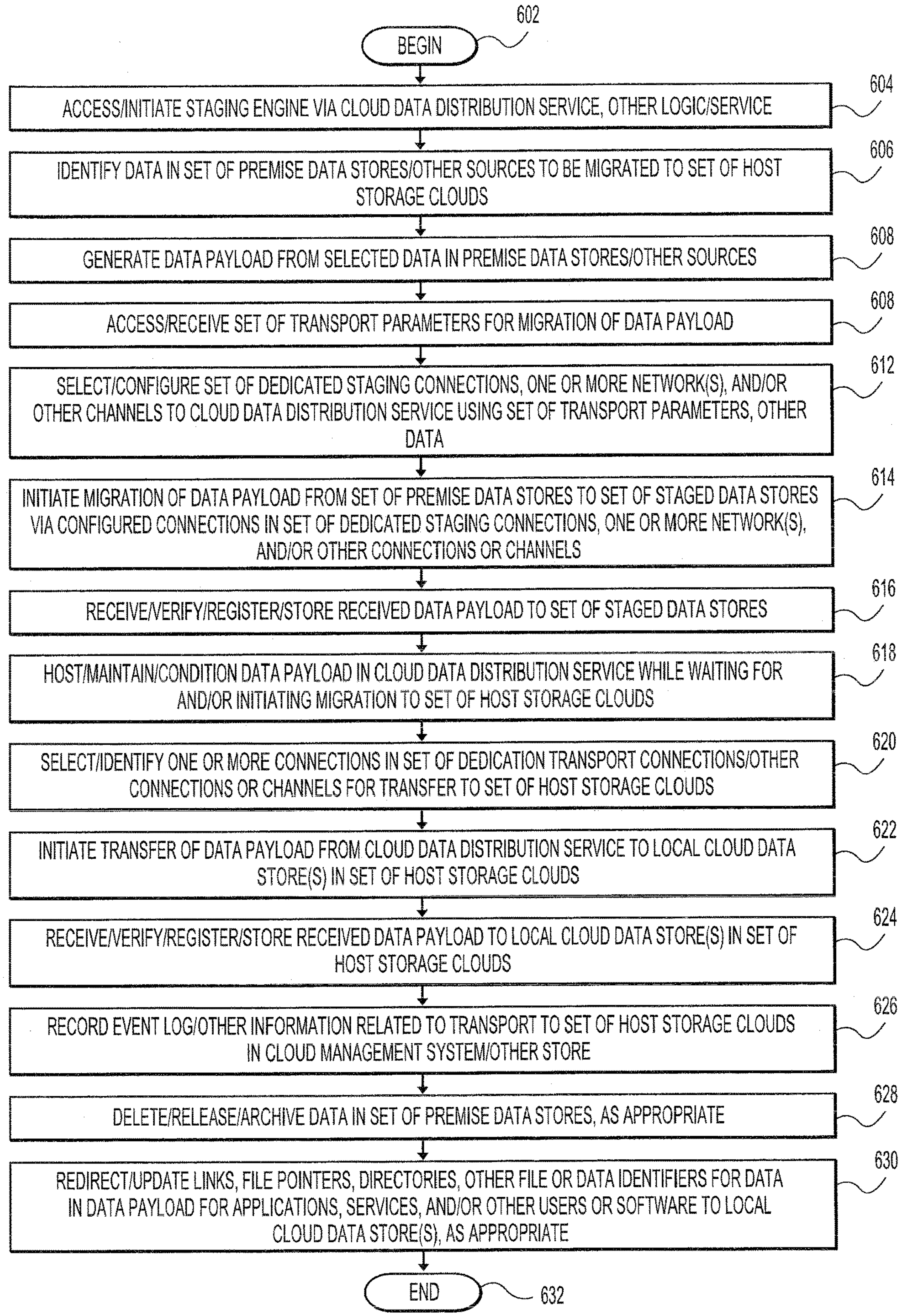
FIG. 6 illustrates a flowchart for data extracting, staging, and delivery processing via an intermediate or independent data delivery service, according to various embodiments.

FIG. 6 illustrates a flowchart of overall processing that can be used to identify, queue, stage, and/or otherwise transport or manage the data payload 184 and/or other data or information, according to various aspects of the present teachings. In 602, processing can begin. In 604, the staging engine 174 can be accessed and/or initiated, for instance via the data distribution service 172 and/or other logic or service. In 606, the staging engine 174 and/or other logic or service can identify the data in the set of premise data stores 168 and/or other data sources too be migrated to the set of host storage clouds 182. In aspects, the data in the set of premise data stores 168 to be migrated can be identified via user selection or input, automatically via applications or services, and/or using other techniques, inputs, or criteria. In 608, the data distribution service 172 and/or other logic or service can generate, discover, inventory, and/otherwise identify the data to comprise the data payload 184 from the data selected in the set of premise data stores 168 and/or other data stores or sources. In 610, the staging engine 174 can access and/or receive the set of transport parameters 186 for the migration of the data payload 184. In aspects, the set of transport parameters 186 can specify, encode, store, and/or otherwise indicate the variables and/or configuration settings to be used to initiate, conduct, and manage the transport of the data payload 184 to the data distribution service 172 and/or to the eventual one or more local cloud data store(s) 180 in the set of host target clouds 182. In aspects, the set of transport parameters 186 can, for instance, include values for the size of the data to be extracted into the data payload 184, the format or encoding of the data to be extracted into the data payload 184, the language or other attributes of the data payload 184, the schedule by which the transport of the data payload 184 is to be conducted, selected and/or preferred connections by which the transport of the data payload 184 is to be conducted, user names or other identifiers for administrator, owner, operator, and/or other user to have access and/or management privileges during the transport of the data payload 184, and/or other parameters, settings, and/or variables.

In 612, the staging engine 174 and/or other logic or service can select, identify, and/or configure the set of dedicated staging connections 170, as well as one or more networks 106, and/or other channels or connections to the data distribution service 172 using the set of transport parameters 186 and/or other data. For example, the set of transport parameters 186 and/or other data can identify the vendors, carriers, and/or services or providers of the set of dedicated staging connections 170 and/or other channels or connections. For example, the set of transport parameters 186 and/or other data can identify the bandwidth capacities or classes of the set of dedicated staging connections 170 and/or other channels or connections, for example to permit the staging engine 174 and/or other logic or service to select channels or connections from amongst the set of dedicated staging connections 170 and/or other channels or connections that satisfy those or other specifications. In 614, the staging engine 174 and/or other logic or service can initiate the migration, transfer, or transport of the data payload 184 and/or associated information from the set of premise data stores 168 and/or other data stores or sources to the set of staged data stores 176 via the configured or selected connections in the set of dedicated staging connections 170, one or more networks 106, and/or other connections or channels. In aspects, the data transport can be initiated by transmitting one or more commands, messages, or signals from the staging engine 174 to the user premise network 160, the set of dedicated staging connections 170, and/or other network elements, sites, or services. In 616, the staging engine 174 and/or other logic or service can receive, verify, register, and/or store the received data payload 184 and/or associated information in or to the set of staged data stores 176 and/or other data stores or resources. In aspects, the set of staged data stores 176 can be or include data bases, server and/or storage farms, data centers, and/or other data hosting facilities co-hosted, co-located, located within geographic proximity to, and/or otherwise integrated with the data distribution service 172. In aspects, the staging engine 174 and/or other logic or service can, in instances, preserve or maintain the data format or configuration in the data payload 184 and/or associated information in the set of staged data stores 176 that was used in the storage of the same or similar data in the user premise network 160 and/or other data source. In aspects, the staging engine 174 and/or other logic or service can, in instances, also or instead update or modify the data format or configuration in the data payload 184 and/or associated information in the set of staged data stores 176 that was used in the storage of the same or similar data in the user premise network 160 and/or other data source.

In 618, the staging engine 174 and/or other logic or service can host, maintain, and/or otherwise manage or condition the data payload 184 and/or associated information in the data distribution service 172, while waiting for and/or initiating the migration of that data out of the data distribution service 172 to the set of host storage clouds 182. In aspects, the staging engine 174 and/or other logic or service can enforce privacy or access controls, such as to apply an access control list (ACL) to govern access to the data payload 184 and/or other associated information while stored or hosted in the data distribution service 172. In 620, the staging engine 174 and/or other logic or service can select and/or identify one or more connections in the set of dedicated transport connections 178 and/or other connections or channels for transfer of the data payload 184 and/or other associated information to the set of host storage clouds 182 and their associated storage resources. In aspects, the set of dedication transport connections 178 can be or include channels or connections of the same general type or types as the set of dedicated staging connections 170, and/or can be or include different or additional channels, connections, and/or services. In aspects, the set of dedicated transport connections 178 can be located within geographic proximity to some or all of the one or more local cloud data stores 180 of one, some, or all clouds in the set of host storage clouds 182, in the same senses described herein. In 622, the staging engine 174 and/or other logic or service can initiate the transport or transfer of the data payload 184 and/or associated information from the set of staged data stores 176 and/or other data sources of the data distribution service 172 to the one or more local cloud data stores 180 in or of the set of host storage clouds 182. For instance, the transport process can be initiated by or via a set of commands or instructions sent from the staging engine 174 to the cloud management system(s) 104 of the set of host storage clouds 182, by automatic initiation at scheduled times and/or based on programmed or predetermined conditions, and/or via other activation mechanisms. In 624, the one or more local cloud data stores 180 of one or more clouds in the set of host storage clouds 182 and/or other logic or service can receive, verify, register, encode, and/or otherwise store the data payload 184 and/or associated information. In aspects, for instance, the cloud management system(s) 104 of the corresponding clouds in the set of host storage clouds 182 can register or record the entry of the data payload 184 and/or associated information in a file storage system, such as a directory and/or other type of file or data record. In 626, the staging engine 174, one or more cloud management system(s) 104, and/or other logic or service can record an event log and/or other tracking information related to the transport of the data payload 184 and/or other information to the set of host storage clouds 182 in or to the cloud management system(s) 104 and/or other data store or stores. In 628, the staging engine 174, user premise network 160, cloud management system(s) 104, and/or other logic or service can delete, release, mark, deactivate, and/or otherwise archive or process the data corresponding to the data payload 184, and/or associated data, in or from the set of premise data stores 168. In 630, the staging engine 174, cloud management system(s) 104, and/or other logic or service can redirect and/or update one or more links, file names, file pointers, directories, and/or other file or data identifiers for data in the data payload 184 and/or associated information to indicate data storage locations in the one or more local cloud data stores 180 for the use of or access by applications, services, and/or other users or software. In 632, processing can repeat, return to a prior processing point, jump to a further processing point, or end.

Figure 7:
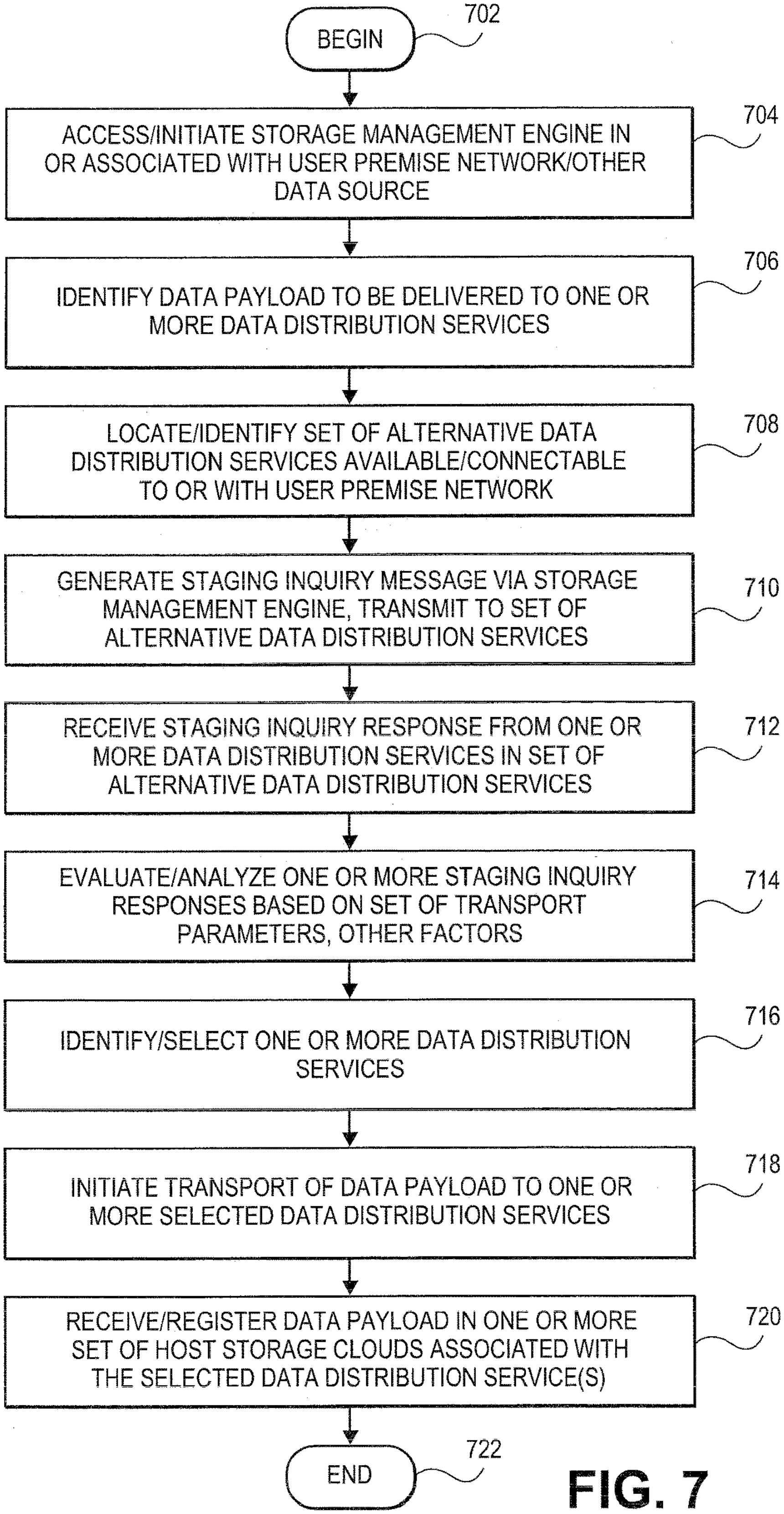
FIG. 7 illustrates a flowchart for managing the staging of a data payload to one, two, and/or other numbers of data distribution services on a marketplace or competitive basis, according to various embodiments.

FIG. 7 illustrates a flowchart of processing that can be used to organize, manage, and select staging services for a user premise network 160 from amongst a set of alternative data distribution services 194, according to various aspects. In 702, processing can begin. In 704, an administrator and/or other user can access and/or initiate the storage management engine 196 in or associated with the user premise network 160, for instance by initiating a Web browser or other application or interface on a client machine, console, and/or other terminal or access point. In 706, the storage management engine 196 and/or other logic or service can identify the data payload 184 to be conditioned and prepared for uploading or transport to one or more data distribution services in the set of alternative data distribution services 194. For instance, the files, directories, databases, and/or folders hosting or storing the data payload 184 in the user premise network 160 can be discovered and/or identified.

In 708, the storage management engine 196 and/or other logic or service can locate and/or identify the set of alternative data distribution services 194 that are available, connectable, and/or otherwise serviceable to or for the user premise network 160, for instance by performing a search or discovery process to locate all data distribution services that can connect to the user premise network 160 using a set of dedicating staging connections 170. In 710, a staging inquiry message 198 can be generated via the storage management engine 196 and/or other logic or service, and that message can be transmitted to the set of alternative data distribution platforms 194 and/or other data facilities. In aspects, the staging inquiry message 198 can be or include a set of requests for details related to data staging services and the capabilities and/or configurations of those services, such as the data capacity of those services, the available connections to or from those services, subscription fees, rates, surcharges, and/or other costs or cost factors associated with those services, security or backup services available from each service, cloud providers who may be available to support or provide the set of host storage clouds 182 and/or the set of competitive cloud datacenters 190 available from or with a data distribution service, and/or other service, support, maintenance, and/or management features available from or through each data distribution service. In aspects, the staging inquiry message 198 can also include information related to intended or possible schedules for the delivery and transfer of the data payload 184 to each of the set of alternative data distribution services 194. In aspects, the staging inquiry message 198 can be or include, or include parts of, the set of transport parameters 188, and can request confirmation or indication whether each service in the set of alternative data distribution services 194 can provide or be compatible with the set of transport parameters 188. The staging inquiry message can also include requests, inquiries, interrogations, and/or other commands or data related to the capabilities of each of the services in the set of alternative data distribution services 194.

In 712, the storage management engine 196 and/or other logic or service can receive one or more staging inquiry response 200 from the set of alternative data distribution services 194, for instance, a set of messages from one or more data distribution service sin the set of alternative data distribution services 194 responding to the queries, specifications, commands, and/or other information in the staging inquiry message 198. In aspects, one or more of the data distribution services in the set of alternative data distribution services 194 may indicate in the one or more staging inquiry responses 200 that they can not support or provide data transport services required or requested in the staging inquiry message 198, for instance due to capacity constraints, scheduling constraints, data compatibility constraints or conflicts, and/or other variables or factors. In aspects, one or more of the data distribution services in the set of alternative data distribution services 194 may indicate in the one or more staging inquiry responses 200 that they are available or compatible with the transport requirements reflected in the staging inquiry message 198, and can confirm available data capacities in those services, available schedules for transport activities, subscription, lease, and/or other fees or costs, and/or other operational parameters related to each responding data distribution service. In 714, the storage management engine 196 and/or other logic or service can evaluate, sort, filter, rate, rank, and/or otherwise analyze the one or more staging inquiry responses 200 based on the set of transport parameters 188 and/or other factors, tests, templates, and/or criteria. For example, the storage management engine 196 and/or other logic or service can sort all compatible data distribution services based on the anticipated or calculated costs of executing a transport of the data payload 184 to each respective data distribution service in the set of alternative data distribution services 194. For further example, the storage management engine 196 and/or other logic or service can in addition or instead rank the responding services based on earliest delivery times and/or other schedule points those services can provide for the transfer of the data payload 184 and/or associated data. For yet further example, the storage management engine 196 and/or other logic or service can in addition or instead rank the responding services based on the rated strength of security or authentication services provided by those services. Other variables, features, and/or criteria can be used to analyze the one or more staging inquiry responses 200. In implementations, the analysis of the staging inquiry response 200 can include a listing, rating, weighting, and/or ranking of services in the set of alternative data distribution services 194, for example from one to ten or other number of services based on their overall compatibility and/or performance.

In 716, the storage management engine 196 and/or other logic or service can identify and/or select one or more data distribution services in the set of alternative data distribution services 194 based on the analysis of 714 to initiate or schedule data staging, distribution, and/or related services. In cases, the storage management engine 196 and/or other logic or service can select one data distribution service in the set of alternative data distribution services 194, for instance, based on cost, schedule, capacity, security, and/or other factors. In cases, the storage management engine 196 and/or other logic or service can select two or more data distribution services in the set of alternative data distribution services 194, for instance based on the same or other factors or criteria. In aspects, the selected data distribution service or services can be selected based on the ranking, weighting, and/or rating of those services in cases where numerical, ordinal, and/or other ratings are generated. In aspects, the selected data distribution service or services can be automatically selected or identified by the storage management engine 196 and/or other logic or service. In aspects, the user can supply, identify, and/or input filters or criteria to be used in the selection of the desired data distribution service or services. In aspects, the selected data distribution service or services can in addition or instead be directly or manually selected or identified by or using user input, for instance, using a selection dialog and/or other interface or tool. In aspects, in cases where two or more data distribution services are selected or identified, the storage management engine 196 and/or other logic or service can determine that one of the selected services can transport one portion of the data payload 184, and one or more other data distribution services can transport another one or more portions of the data payload 184. Similarly, in cases where two or more data distribution services are selected or identified, the storage management engine 196 and/or other logic or service can determine that one of the selected services can transport a portion of the data payload 184 at one scheduled time or interval, and one or more other data distribution services can transport another one or more portions of the data payload 184 at one or more other scheduled times or intervals. Other techniques, decision rules, criteria, and/or decompositions of the data payload 184 or schedule for a transport event can be used to select the data distribution service or services to be used to transfer and stage the data payload 184, for cloud delivery and/or other purposes.

In 718, the storage management engine 196 and/or other logic or service can initiate the transport of the data payload 184 to the selected data distribution service(s) in the set of alternative data distribution services 194, for instance by transmitting a set of transport management commands, and/or scheduling the initiation of the data transport even via an application, interface, and/or service. In 720, the data payload 184 can be received and/or registered in one or more host storage clouds 182 associated with the selected data distribution service(s) in the set of alternative data distribution services 194. For example, the constituent parts of the data payload 184, such as files or directories, can be registered to a file storage system of the set of host storage clouds 182 via the corresponding cloud management systems 104 of those clouds, and/or can be registered, stored, and/or encoded in the set of host storage clouds 182 using other formats, identifiers, and/or techniques. In 722, as understood by persons skilled in the art, processing can repeat, return to a prior processing point, jump to a further processing point, or end.

The foregoing description is illustrative, and variations in configuration and implementation may occur to persons skilled in the art. For example, while embodiments have been described in which the cloud management system 104 for a particular cloud resides in a single server or platform, in embodiments the cloud management system 104 and associated logic can be distributed among multiple servers, services, or systems. Similarly, while embodiments have been described in which one group of servers within a set of resource servers 108 can provide one component to build a requested set of virtual machines, in embodiments, one group of resource servers can deliver multiple components to populate the requested set of instantiated virtual machines 116, and/or other machines, entities, services, or resources. Other resources described as singular or integrated can in embodiments be plural or distributed, and resources described as multiple or distributed can in embodiments be combined. The scope of the invention is accordingly intended to be limited only by the following claims.

What is claimed is:

1. A method comprising:

identifying a data payload to be transported from a data source in a premise network, wherein the premise network comprises one or more first server devices;

identifying a set of alternative data distribution services comprising one or more second server devices and communicably coupled between the premise network and a set of destination host storage clouds each comprising one or more third server devices, the set of alternative data distribution services to provide data transportation by intermediately staging uploads of a data payload to the set of destination host storage clouds identified by internet protocol (IP) addresses, wherein the set of destination host storage clouds are different than the set of alternative data distribution services, and wherein the set of alternative data distribution services store the data payload in a set of staged data stores during staging, query the premise network for updates to the data payload during staging of the data payload, and incorporate received updates into the data payload stored in the set of staged data stores prior to uploading the data payload to the set of destination host storage clouds identified by the IP addresses, and the set of alternative data distribution services to validate the integrity of the data payload using a check-sum during the data transportation, wherein each of the set of alternative data distribution services has at least one associated set of connections from the premise network to a respective data distribution service, and wherein each of the set of destination host storage clouds comprises a set of local cloud data stores, and the data payload is configured to be transported from the at least one of the set of alternative data distribution services to a corresponding set of local cloud data stores via at least one of the set of connections;

receiving, via an application interface, selection of a set of transport parameters to be provided by the set of alternative data distribution services responsive to transporting the data payload from the premise network to the alternative data distribution services and responsive to transporting the data payload from the alternative data distribution services to the set of destination host storage clouds, wherein the set of transport parameters comprises a type of encryption to be performed to encrypt the data payload during the data transportation;

transmitting a staging inquiry message to the set of alternative data distribution services, the staging inquiry message comprising the set of transport parameters;

receiving one or more staging inquiry responses from the set of alternative data distribution services, each of the one or more staging inquiry responses comprising a respective indication of an ability of one of the set of alternative data distribution services to perform a transport of the data payload in view of the set of transport parameters;

ranking each of the one or more staging inquiry responses in view of a respective authentication service as applied by one of the set of alternative data distribution services to determine an order with respect to the set of alternative data distribution services;

selecting, by a processor and in view of the order, at least one of the set of alternative data distribution services to stage the data payload for a defined time interval and to transport the data payload to the set of destination host storage clouds after the defined time interval; and in response to a determination that the data payload is to be staged on the at least one of the set of alternative data distribution services for the defined time interval, transporting the data payload to the at least one of the sets of alternative data distribution services to facilitate application, via the at least one alternative data distribution services, of an access control to the data payload throughout a period during which the data payload is staged on the identified at least one of the set of alternative data distribution services.

2. The method of claim 1, wherein the data source in the premise network comprises a set of premise data stores.

3. The method of claim 2, wherein the data payload comprises at least one of a set of selected databases, directories, or files stored in the set of premise data stores.

4. The method of claim 1, wherein the at least one associated set of connections for each of the set of alternative data distribution services comprises at least one of a wide area network (WAN), a metropolitan area network (MAN), or an optical network connection.

5. The method of claim 1, wherein each of the set of alternative data distribution services comprises the set of staged data stores.

6. The method of claim 1, wherein each of the set of alternative data distribution services comprises the set of connections to the set of destination host storage clouds.

7. The method of claim 1, wherein the set of transport parameters further comprises at least one of a data transport schedule, a set of cost factors, a set of data transport initiation conditions, a set of data transport bandwidth requirements, or a set of storage capacity requirements for the data payload.

8. The method of claim 1, wherein the ranking of the one or more staging inquiry responses comprises generating a rating of each of the set of alternative data distribution services.

9. The method of claim 8, wherein the identifying at least one of the set of alternative data distribution services to stage the data payload comprises selecting a data distribution service having a highest rating.

10. The method of claim 9, wherein the identifying at least one of the set of alternative data distribution services comprises identifying a plurality of alternative data distribution services.

11. The method of claim 10, further comprising generating a division of the data payload to be delivered to each of the plurality of alternative data distribution services.

12. The method of claim 10, wherein the plurality of alternative data distribution services are identified in view of the plurality of alternative data distribution services having highest ratings.

13. A system comprising:

an interface to a set of alternative data distribution services; and a processor to communicate with the set of alternative data distribution services via the interface, the processor to:

identify a data payload to be transported from a data source in a premise network, wherein the premise network comprises one or more first server devices;

identify the set of alternative data distribution services comprising one or more second server devices and communicably coupled between the premise network and a set of destination host storage clouds each comprising one or more third server devices, the set of alternative data distribution services to provide data transportation by intermediately staging uploads of a data payload to the set of destination host storage clouds identified by internet protocol (IP) addresses, wherein the set of destination host storage clouds are different than the set of alternative data distribution services, and wherein the set of alternative data distribution services store the data payload in a set of staged data stores during staging, query the premise network for updates to the data payload during staging of the data payload, and incorporate received updates into the data payload stored in the set of staged data stores prior to uploading the data payload to the set of destination host storage clouds identified by the IP addresses, and the set of alternative data distribution services to validate the integrity of the data payload using a check-sum during the data transportation, wherein each of the set of alternative data distribution services has at least one associated set of connections from the premise network to a respective data distribution service, and wherein each of the set of destination host storage clouds comprises a set of local cloud data stores, and the data payload is configured to be transported from the at least one of the set of alternative data distribution services to a corresponding set of local cloud data stores via at least one of the set of connections;

receive, via an application interface, selection of a set of transport parameters to be provided by the set of alternative data distribution services responsive to transporting the data payload from the premise network to the alternative data distribution services and responsive to transporting the data payload from the alternative data distribution services to the set of destination host storage clouds, wherein the set of transport parameters comprises a type of encryption to be performed to encrypt the data payload during the data transportation;

transmit a staging inquiry message to the set of alternative data distribution services, the staging inquiry message comprising the set of transport parameters;

receive one or more staging inquiry responses from the set of alternative data distribution services, each of the one or more staging inquiry responses comprising a respective indication of an ability of one of the set of alternative data distribution services to perform a transport of the data payload in view of the set of transport parameters;

rank each of the one or more staging inquiry responses in view of a respective authentication service as applied by one of the set of alternative data distribution services to determine an order with respect to the set of alternative data distribution services;

select, in view of the order, at least one of the set of alternative data distribution services to stage the data payload for a defined time interval and to transport the data payload to the set of destination host storage clouds after the defined time interval; and in response to a determination that the data payload is to be staged on the at least one of the set of alternative data distribution services for the defined time interval, transport the data payload to the at least one of the sets of alternative data distribution services to facilitate an application, via the at least one alternative data distribution services, of an access control to the data payload throughout a period during which the data payload is staged on the at least one of the set of alternative data distribution services.

14. The system of claim 13, wherein the data source in the premise network comprises a set of premise data stores.

15. The system of claim 13, wherein each of the set of alternative data distribution services comprises the set of connections to the set of destination host storage clouds.

16. The system of claim 13, wherein the set of transport parameters comprises at least one of a data transport schedule, a set of cost factors, a set of data transport initiation conditions, a set of data transport bandwidth requirements, a set of storage capacity requirements, a set of regulatory compliance requirements, or a set of security settings for the data payload.

17. The system of claim 13, wherein the ranking of the one or more staging inquiry responses comprises a generation of a rating of each of the set of alternative data distribution services.

18. The system of claim 17, wherein to identify the at least one of the sets of alternative data distribution services to stage the data payload is to select a data distribution service having a highest rating.

19. The system of claim 17, wherein to identify the at least one of the sets of alternative data distribution services is to identify a plurality of alternative data distribution services.

* * * * *